May 23, 1944. H. N. RIDER ET AL 2,349,464
FLUID RELEASE VALVE AND ACTUATING MECHANISM
Filed Oct. 19, 1942 5 Sheets-Sheet 5

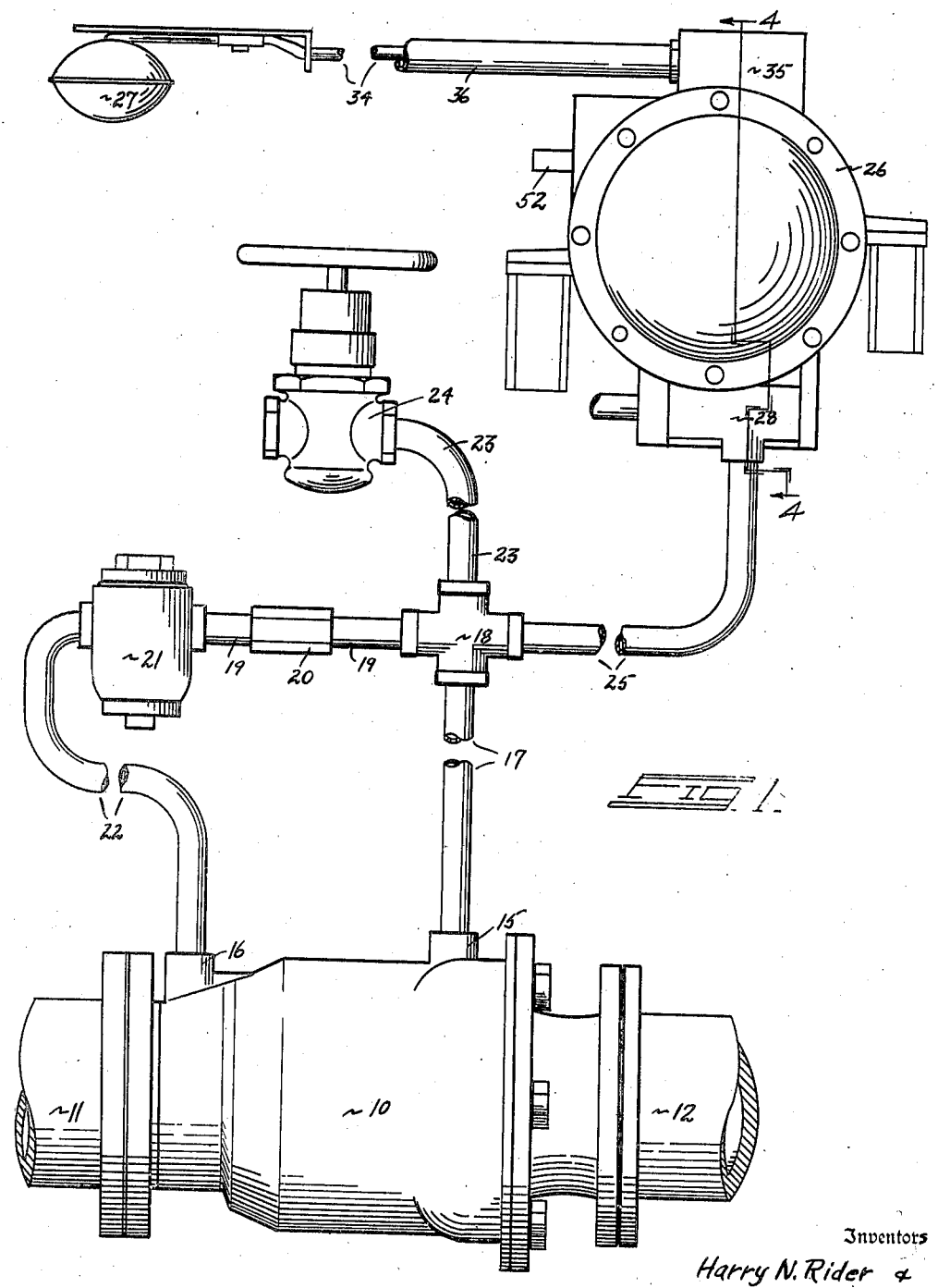

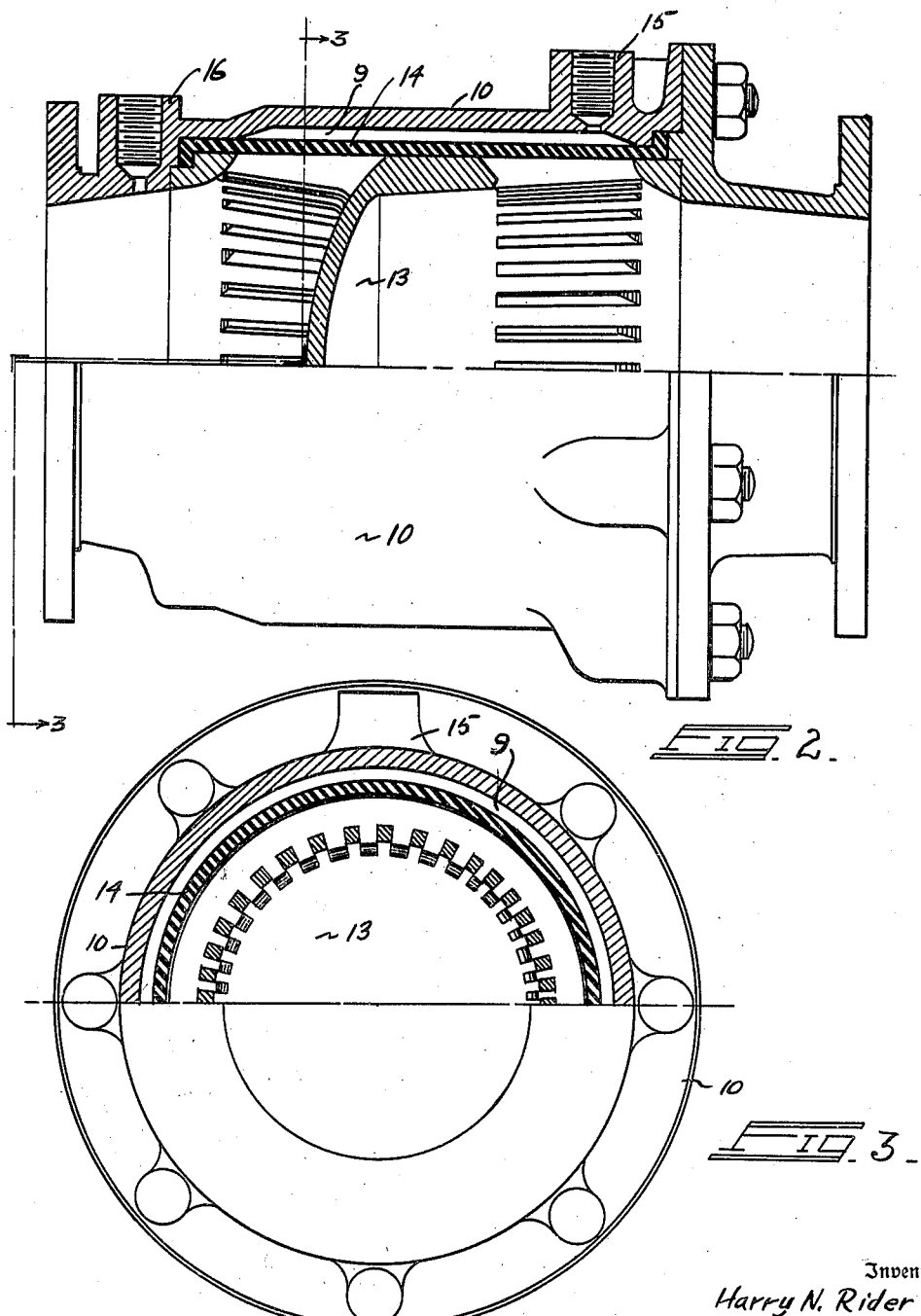

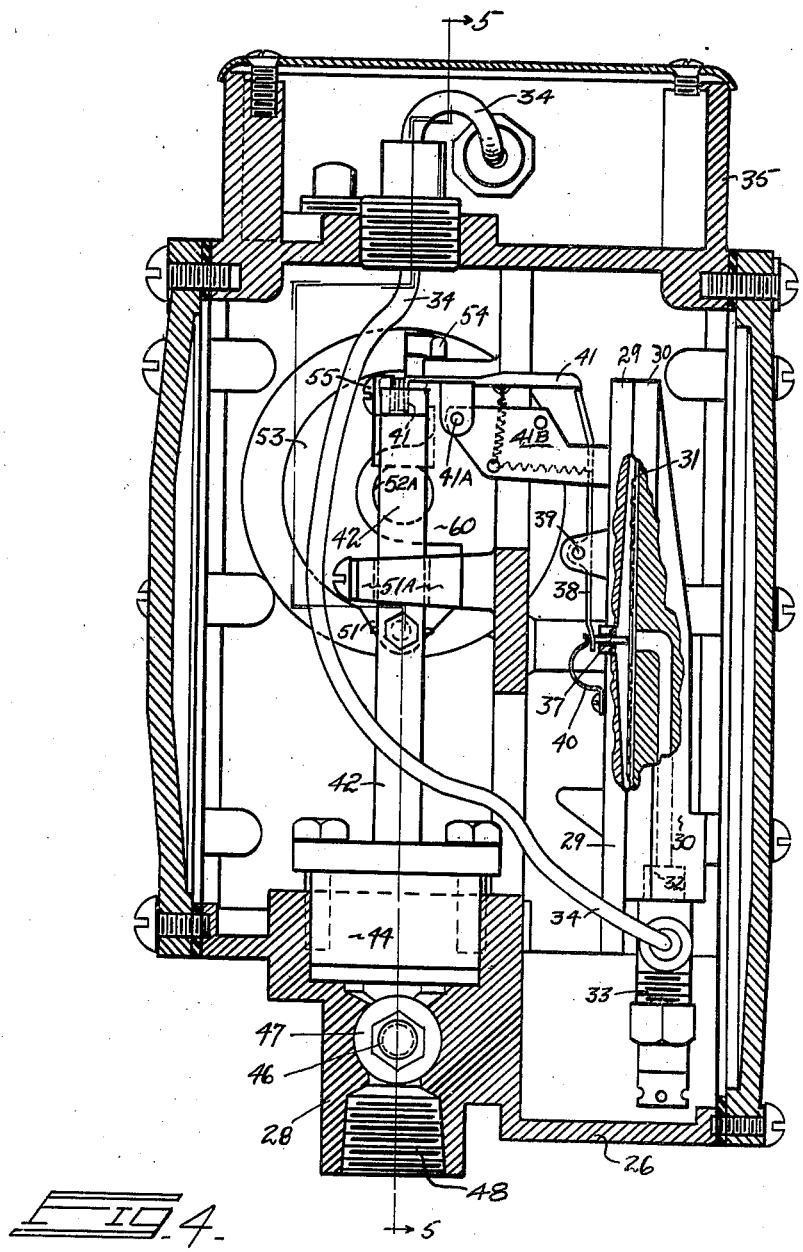

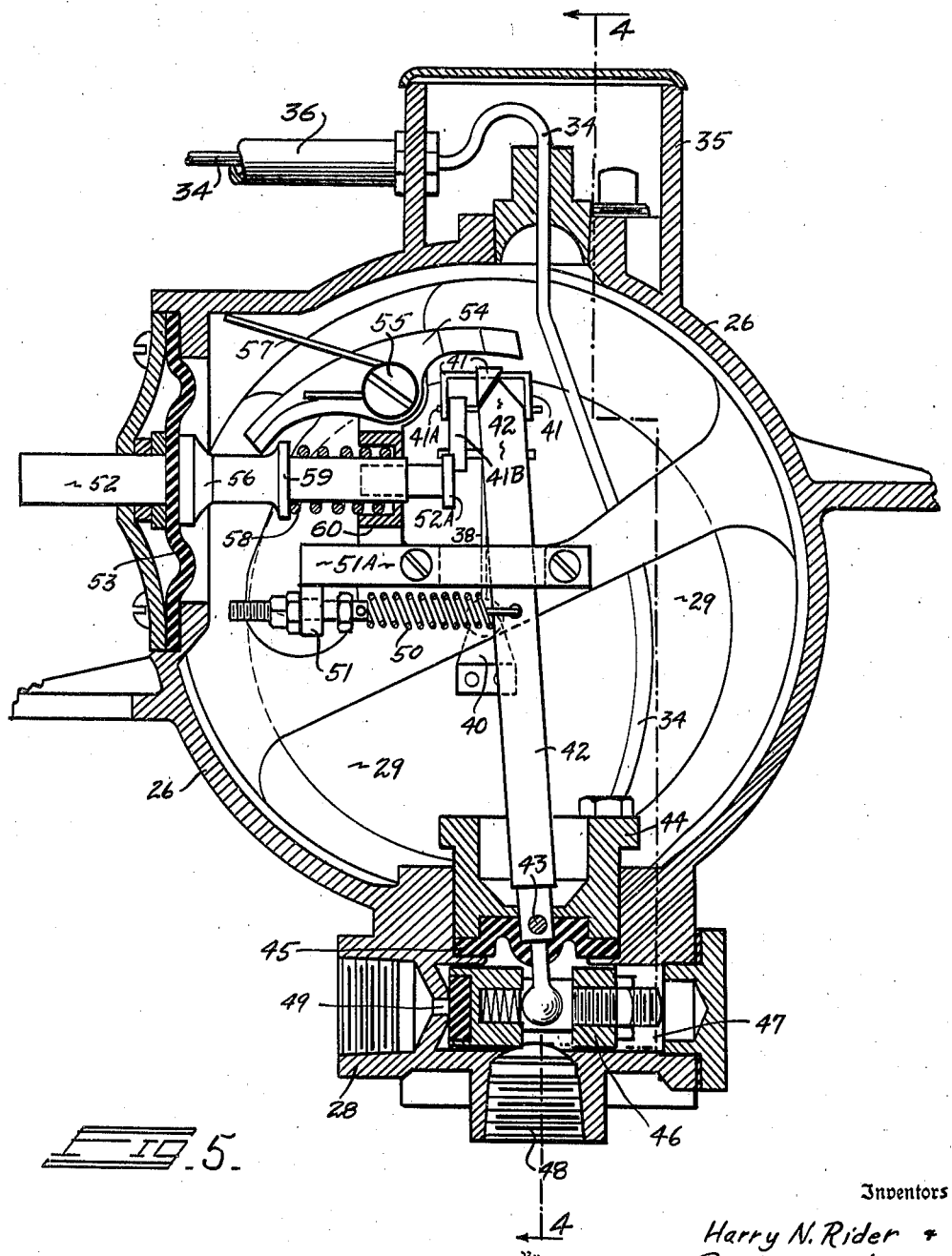

Inventors
Harry N. Rider &
Fred G. Dieter
By W. B. Harpman Attorney

Patented May 23, 1944

2,349,464

UNITED STATES PATENT OFFICE 2,349,464

FLUID RELEASE VALVE AND ACTUATING MECHANISM

Harry N. Rider and Fred G. Dieter, Youngstown, Ohio, assignors to "Automatic" Sprinkler Company of America, Youngstown, Ohio, a corporation of Delaware Application October 19, 1942, Serial No. 462,630

5 Claims. (Cl. 169—17)

This invention relates to an actuating mechanism adapted for use in connection with fluid control valves as used in fire extinguishing apparatus and allied systems.

The principal object of the invention is the provision of a fluid release valve and actuating mechanism therefor incorporating a relief valve and means subject to actuation by remotely positioned heat actuated devices for actuating the said relief valve.

A further object of the invention is the provision of a valve actuating mechanism wherein positive spring tensioned means are employed for actuating a relief valve incorporated in the device.

A further object of the invention is the provision of a valve actuating mechanism including reset mechanism adapted to enable the manual resetting of the actuating and relief valve portions of the device.

The valve actuating mechanism which is the subject of this invention, has been designed to provide a dependable means of actuating a differential type fluid control valve which is itself incorporated in a fluid channel, as for example a main control valve in a fire extinguishing system. As set forth herein, the fluid release valve is shown in conjunction with an expansible tube type control valve wherein the valve action of the said expansible tube type valve is dependent upon unequalization of fluid pressures therein, the release valve is placed in communication with the said expansible tube type valve in a manner so that upon being actuated, the release valve relieves fluid pressure from one portion of the said expansible tube type valve with the result that the said valve immediately opens and permits the flow of fluid therethrough. The release valve itself is adapted to be actuated either by pneumatically operated heat actuated devices or electrically operated heat actuated devices which heat actuated devices may be and usually are remotely positioned with respect to the said release valve.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

Figure 1 is a plan view of a complete adaptation of the release valve and shows the same in operative connection with a heat actuated device and a main fluid control valve of the expansible tube type.

Figure 2 is a side elevation with parts in cross section illustrating the structure of the expansible tube type main control valve shown in Figure 1.

Figure 3 is a cross sectional elevation taken on lines 3—3 of Figure 2.

Figure 4 is a cross sectional side elevation of the fluid release valve on the line 4—4 of Figures 1 and 5.

Figure 5 is a cross sectional elevation of the release valve and its actuating mechanism taken on lines 5—5 of Figure 4.

Figure 6:
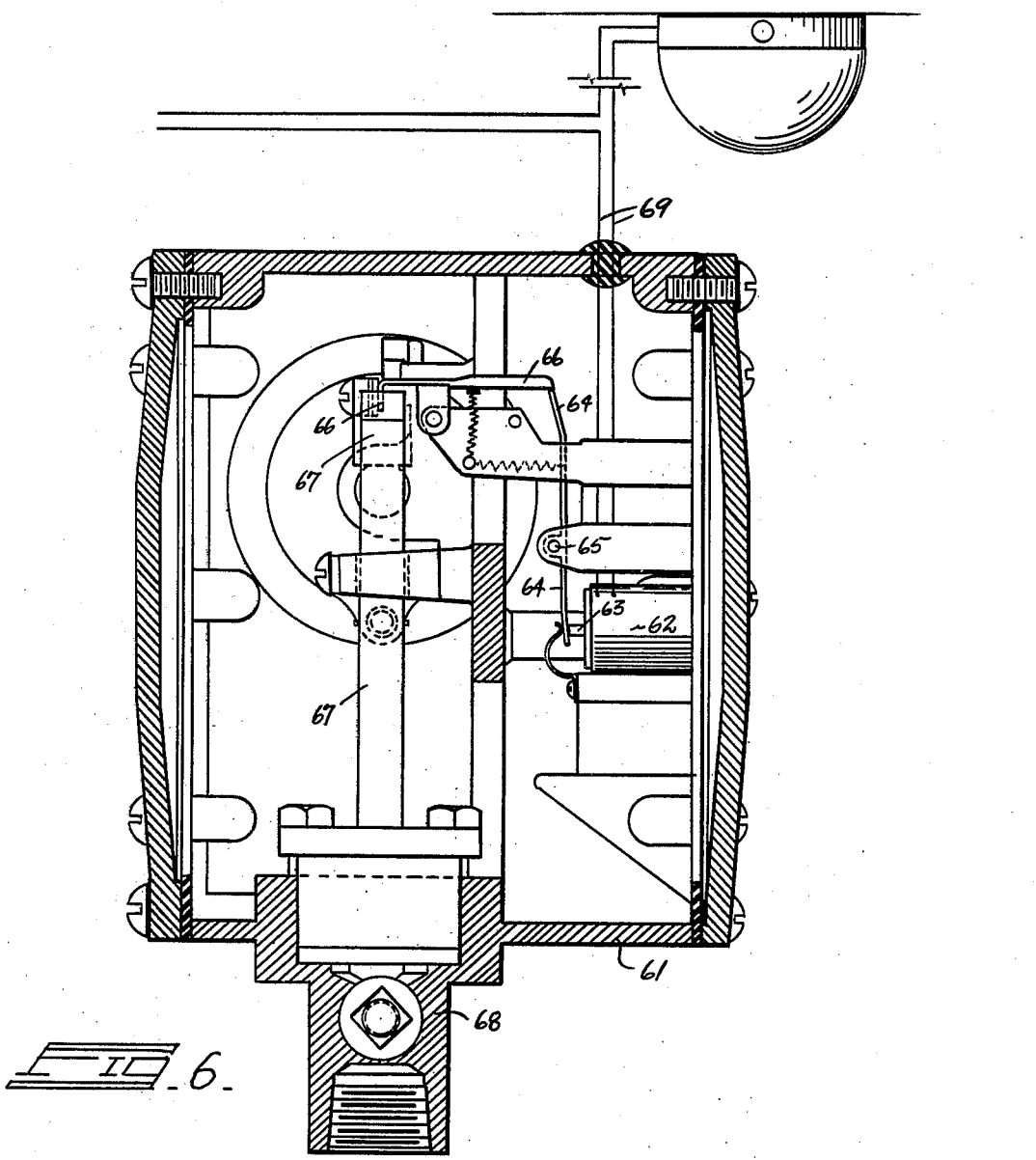
Figure 6 is a cross sectional side elevation of a modified form of the mechanism.

By referring to the drawings and Figure 1 in particular, it will be observed that a main fluid control valve, indicated by the numeral 10, comprising a valve of the expansible tube type, has been positioned in a fluid carrying pipe the supply side of which is indicated by the numeral 11 and the outlet side of which is indicated by the numeral 11 and the outlet side of which is indicated by the numeral 12. In actual use such as in connection with a fire extinguishing system of a vessel, the supply pipe 11 is placed in communication with a fluid source while the outlet side 12 is placed in communication with suitable sprinkler piping located throughout the various holds and compartments of the vessel, which sprinkler piping is equipped with conventional sprinklers. In ordinary operation, the fluid pressure in the supply pipe 11 is constant and the valve 10 serves to block the flow of fluid to the sprinkler piping and sprinklers.

By referring to Figures 2 and 3 of the drawings, it will be observed that the valve 10 of the expansible tube type comprises a body which is generally indicated by the numeral 10 and which is provided with a core 13 which forms in effect a member spaced apart from and centrally positioned in the interior of the body 10. An expansible tube indicated by the numeral 14 is positioned between the core 13 and the interior surface of the body 10 and is appropriately held at each end so that an annular chamber 9 is formed between the interior surface of the body 10 and the outer surface of the expansible tube 14. The inner surface of the expansible tube 14 is adapted to rest against the core 13 and in that position fluid entering the valve cannot pass therethrough as the expansible tube closes the area around the periphery of the core member 13. In order that fluid pressure may be introduced into the chamber 9, a drilled and tapped opening 15 is provided which communicates therewith. A secondary drilled and tapped opening 16 communicating with the valve body adjacent the fluid supply source is also provided and as may be seen by again referring to Figure 1 of the drawings, tubular connections established between the openings 16 and 15 permits fluid under pressure from the supply source to enter the chamber 9. Fluid in the annular shaped chamber 9 will, due to the differential existing, caused by the thickness of the expansible tube itself, serve to hold the expansible tube tightly against the core member 13 thereby blocking the flow of fluid through the valve proper. It is thus apparent that so long as the fluid pressure on the outer surface of the expansible tube 14 equals the fluid pressure on the interior of the valve, the valve will remain closed since the external area of the expansible tube 14 is greater than its internal area. In order to open the valve, it is necessary to relieve this fluid pressure on the outer surface and by referring to Figure 1 of the drawings, it will be seen that two means have been provided for accomplishing this object. The drilled and tapped opening 15 which communicates with the annular chamber 9 about the outer surface of the expansible tube 14, is placed in communication with a tube 17 which in turn communicates with a fitting 18. The fitting 18 communicates by means of a tube 19 and a union 20 with a filter 21 which in turn is placed in communication with the drilled and tapped opening 16 by means of a tube 22. Thus, fluid from supply source 11 entering the valve body 10, leaves the same by means of the drilled and tapped opening 16, passes through the filter 21, the union 20 and the tubular connection 19 into the fitting 18 and is placed in communication with the drilled and tapped opening 15. It is also placed in communication with a tube 23 which terminates in a manually operated valve 24 which valve permits the manual relief of fluid pressure which will permit the expansible tube 14 in the valve 10 to expand and thereby open a passageway through the main control valve 10. In order that the expansible tube type valve 10 may be opened automatically as upon the outbreak of a fire anywhere within the jurisdiction of the system illustrated, a release valve, the subject of the invention, is placed in communication with the fitting 18 by means of a tubular connection 25 and is indicated in Figure 1 generally by the numeral 26. The release valve mechanism is in turn subject to actuation by remotely positioned heat actuated devices, one of the same, of the pneumatic type, is indicated by the numeral 27 in Figure 1 and is in communication with the valve mechanism 26. The release valve mechanism is actuated by the heat actuated device 27 which creates a pneumatic impulse upon detecting rapidly rising temperatures in the area supervised. The result of such detection is that the opening of a fluid valve 28 which forms a part of the release valve mechanism 26 which valve is in communication with the tubular connection 25 results directly in relieving fluid pressure in the chamber 9 of the main control valve 10 which, as has heretofore been explained, permits the valve 10 to open.

By referring now to Figures 4 and 5 of the drawings, detailed illustrations of the release valve mechanism may be seen. In Figure 4, the housing 26 from which the relief valve portion 28 depends will be seen to enclose a diaphragm unit comprising a pair of diaphragm enclosing discs 29 and 30 having a diaphragm 31 positioned therebetween. It will be observed that the diaphragm disc 30 is provided with a drilled and tapped opening 32 in which a vent body 33 is threadably engaged. The lowermost portion of the vent body 32 is filled with desirable packing material and the vent itself forms a slow acting vent in communication with the diaphragm case 30. In communication with the vent body 33 there is a tube 34 which extends upwardly therefrom and into a secondary housing 35 formed on the uppermost surface of the housing 26. The secondary housing 35 serves as a protective terminal enclosure for the tube 34 which tube is placed in direct communication with the heat actuated devices as heretofore described. The tube 34 is positioned in a steel conduit which affords ample protection for the same. The conduit is indicated in Figure 1 by the numeral 36.

By referring again to the diaphragm unit shown in Figure 4, it will be observed that a bushing pin 37 is positioned in an opening in the diaphragm case 29 so that one end thereof engages the diaphragm 31 and the other end thereof extends outwardly from the said diaphragm case 29. In order that movement imparted to the bushing pin 37 by the diaphragm 31, as in response to a pneumatic impulse generated by one of the heat actuated devices 27 in communication with the diaphragm unit, may be utilized in operating the relief valve 28, an operating lever 38 is pivoted to the diaphragm case 29 by means of a pivot 39, the lowermost end of the operating lever rests against the outermost end of the bushing pin 37 and is normally held in that relation by means of a small strip spring 40, one end of which is also affixed to the diaphragm case 29. The uppermost end of the operating lever 38 terminates beneath a fulcrum lever 41 which in turn is pivoted by means of a pivot 41A to a bracket 41B also formed on the diaphragm case 29. The outermost end of the fulcrum lever 41 is, as best illustrated in Figure 5, provided with a downturned tapered end section which forms a restraining latch for a valve lever 42 which valve lever 42 is pivoted by means of a pivot 43 to a gland member 44 which in connection with a flexible gland 45 through which the valve lever passes, forms a closure between the fluid relief valve 28 and the remainder of the release device.

By referring to Figure 5 wherein the details of the relief valve 28 are more clearly illustrated, it will be observed that a slidable valve element 46 is positioned in a cylindrical valve chamber 47 which is located within the relief valve structure 28. The chamber 47 communicates through an opening 48 with the tubular connection 25 heretofore described as illustrated in Figure 1. The valve chamber 47 communicates at one end thereof with a drilled and tapped restricted opening 49 which comprises the relief opening from which fluid pressure is exhausted at such time as the relief valve 28 is open. It will be observed that the fluid pressure entering the valve chamber 47 through the drilled and tapped opening 48 which is in communication with the tubular connection 25, tends to retain the freely moving, unpacked valve element 46 in closed position against the only outlet and in order that the valve element 46 may be moved to open position, motion imparted to the valve lever 42 must overcome the fluid pressure holding the valve element 46 against the outlet orifice 49. In order that this may be accomplished, a coil spring 50 is provided, one end of which engages an opening formed on the valve lever 42 and the other end of which is adjustably positioned with respect to a bracket 51 which forms a part of the housing 26. An extension 51A of the bracket 51 provides a guide and retaining member for the valve lever 42, as a slot formed therein defines an area in which the valve lever 42 may move. It will thus be seen that at such time as the bushing pin 37 moves outwardly from the diaphragm case 29, it engages, as has heretofore been described, the operating lever 38, pivoted upon the pivot 39 which causes the uppermost end thereof to move outwardly from underneath the fulcrum lever 41 which in turn permits the opposite end of the fulcrum lever 41 to move upwardly. This opposite end of the fulcrum lever comprises the downwardly depending tapered portion 41 which normally acts as a latch in restraining the valve lever 42 from movement, which movement opens the relief valve 28 and permits the relief of the fluid pressure in communication therewith, which fluid pressure normally serves to hold the expansible tube 14 in closed position in the main control valve 10.

In order that the device may be reset after operating, a reset rod 52 is provided which reset rod is positioned through the housing 26 by means of a flexible diaphragm 53, the reset rod is provided at its innermost end with an adjustable resetting pin 52A. The resetting pin 52A is adapted to directly engage the valve lever 42 so as to move it into the position shown in Figure 5 in which the valve element 46 in the valve chamber 47 is in closed position. In order that the fulcrum lever 41 will be positively moved into latched position so that it serves as a latch restraining the valve lever 42 from movement as well as permitting the uppermost end of the operating lever 38 to move in under the one end thereof, a reset lever 54 is provided and is pivoted to a structural portion of the housing 26 by means of a pivot 55 and is so positioned that an end thereof slidably engages the reset rod 52 and is adapted to mount an inclined shoulder 56 formed thereon which imparts upward movement to one end of the reset lever 54 and downward movement to the opposite end, which opposite end is positioned directly over the fulcrum lever 41. A spring 57 is positioned about the pivot 55 and serves to normally retain the upper end of the reset lever 54 in elevated position with respect to the fulcrum lever 41. In order that the reset rod 52 may be moved outwardly after the resetting operation, a coil spring 58 is positioned thereabout and engages a collar 59 formed on the reset rod and an upwardly extending portion 60 of the bracket 51 through which the reset rod passes.

It will thus be seen that movement of the diaphragm 31 in response to a pneumatic impulse originated in a fire zone by one of the heat actuated devices 27 results in the movement of the operating lever 38, the fulcrum lever 41 which permits the valve lever 42 to be moved by the spring 50 which results in opening the valve element 46 in the valve chamber 47 of the relief valve 28 and the relief of fluid pressure in communication therewith.

It will be observed by those skilled in the art that the release valve may be employed for the opening of valves other than the specific form of valve heretofore described.

A modification in the construction of the device is desirable and such modification is set forth in Figure 6 of the drawings.

By referring to the same, it will be observed that a device essentially similar in most respects to that heretofore illustrated and described, is shown. In the modified form, the housing is indicated by the numeral 61. An electrically actuated solenoid, generally indicated by the numeral 62, is positioned within the housing 61 in a manner so that an operating pin 63 thereof directly engages the lower end of an operating lever 64 which in turn is pivoted to the solenoid structure by means of a pivot 65. The uppermost end of the operating lever 64 is positioned beneath one end of a fulcrum lever 66 which fulcrum lever 66 and operating lever 64 correspond in exact detail and operation with the operating lever 38 and fulcrum lever 41 heretofore described. In the modification, as in the device heretofore described, movement imparted to the operating lever 64 results in movement of the fulcrum lever 66 which in turn unlatches a valve lever 67 and permits the same to move. The valve lever 67 serves to open a fluid relief valve 68 which, being in communication with the appropriate portion of the main control valve, results in the relief of fluid pressure therein and the subsequent opening thereof. In the modified form the solenoid 62 is electrically actuated by means of any conventional electric thermostat such as, for example, that shown and described in Patent No. 2,224,738 of December 10, 1940, to E. A. Lowe on Pneumatic and fusible metal electric thermostat; wherein a thermostat capable of operation on both fixed temperature and rate of rise of temperature principles is disclosed. In operation, wires 69 connect the solenoid 62 with a power source and one or more suitable electric thermostats which, being heat actuated devices like that shown in Figure 1 and indicated by the numeral 27, are preferably positioned throughout the fire zone.

It will thus be seen that the fluid release valve, the subject of this invention, when used in connection with a suitable main control valve in a sprinkler system, forms an efficient and dependable means of causing the opening of the main control valve which opening results in the sprinkler systems going into operation in controlling a fire.

Having thus described our invention, what we claim is:

1. In a valve actuating mechanism, a fluid relief valve, a valve lever in operative connection therewith, a tiltable latch lever positioned adjacent said valve lever and adapted to normally hold the said valve lever in inoperative position, a supporting element engageable beneath said tiltable latch lever, and means engageable with said supporting element for moving the same to permit the tilting of the said latch lever, said means comprising a pressure responsive device.

2. In a fire extinguishing apparatus having a pressure controlled fluid release mechanism including a relief valve the main operating elements of which include a valve lever, a tiltable latch lever controlling said valve lever, and moveable support means for said tiltable latch lever enclosed in a sealed housing, an exterior resetting device extending through a sealed opening in said housing, and adapted to engage the said valve lever for the purpose of resetting the same, the said valve lever being operatively connected to the said relief valve.

3. In a release valve mechanism, a fluid relief valve, an operating lever therefor, a latch for said operating lever, a diaphragm, a housing therefor comprising a diaphragm chamber having an outwardly bowed wall adjacent one face of said diaphragm, said diaphragm chamber communicating with a pressure conveying conduit on one side of said diaphragm, detent mechanism operated by said diaphragm for unlatching said latch so as to permit said operating lever to open said relief valve.

4. In a sprinkler system means for opening a fluid pressure actuated main control valve, said means comprising a relief valve in communication with said main control valve, a lever for moving said relief valve, means normally urging said lever to open said valve, a tiltable latch normally restraining said lever, supporting means engageable beneath said tiltable latch for normally supporting the same, a release mechanism for moving said supporting means, heat actuated devices in the fire zone, said release mechanism connected to and actuated by said heat actuated devices.

5. In a release valve mechanism, a fluid relief valve, a valve lever for said relief valve, means normally urging said lever to open said relief valve, means holding said lever inoperative, said means including a tiltable latch lever and supporting means engageable beneath said latch lever for normally supporting the same, means for moving said supporting means away from under said latch lever.

HARRY N. RIDER.
FRED G. DIETER.